United States Patent
Heesch

[11] Patent Number: 5,705,815
[45] Date of Patent: Jan. 6, 1998

[54] DEVICE FOR THE DETECTION OF LIQUID SURFACES

[75] Inventor: Stefan Heesch, Mannheim, Germany

[73] Assignee: Boehringer Mannheim GmbH, Mannheim, Germany

[21] Appl. No.: 599,876

[22] Filed: Feb. 12, 1996

[30] Foreign Application Priority Data

Feb. 11, 1995 [DE] Germany .............. 195 04 579.3

[51] Int. Cl.$^6$ .............................................. G01F 23/292
[52] U.S. Cl. .................. 250/341.2; 250/577; 250/900; 250/901
[58] Field of Search ..................... 250/341.2, 901, 250/900, 577

[56] References Cited

U.S. PATENT DOCUMENTS 4,929,829 5/1990 Dedden et al. ................. 250/208.4
5,059,812 10/1991 Huber ................................. 250/577
5,271,902 12/1993 Sakka et al. ..................... 422/100

Primary Examiner—Constantine Hannaher
Attorney, Agent, or Firm—Nikaido, Marmelstein, Murray & Oram LLP

[57] ABSTRACT

Device for the detection of liquid surfaces including a light source sending light onto a liquid surface, an oscillation element which is moved toward the liquid surface and causes the liquid surface to oscillate upon contact with the surface. The surface contact is detected by a light detector which picks up the radiation reflected by the liquid. Upon contact with the liquid, the light sent out by the light source is modulated by the oscillations of the liquid surface. The so modulated signal can be selectively identified by the detector.

23 Claims, 4 Drawing Sheets

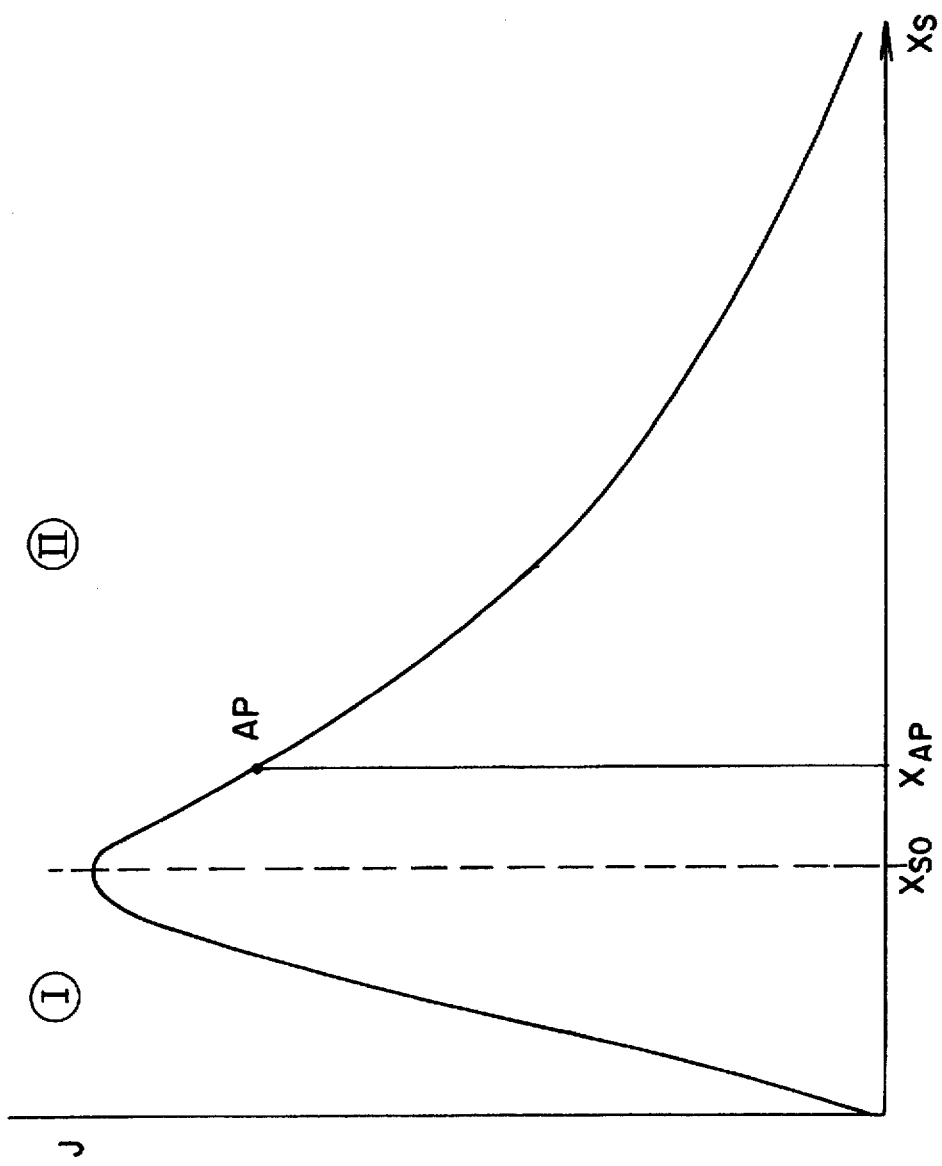
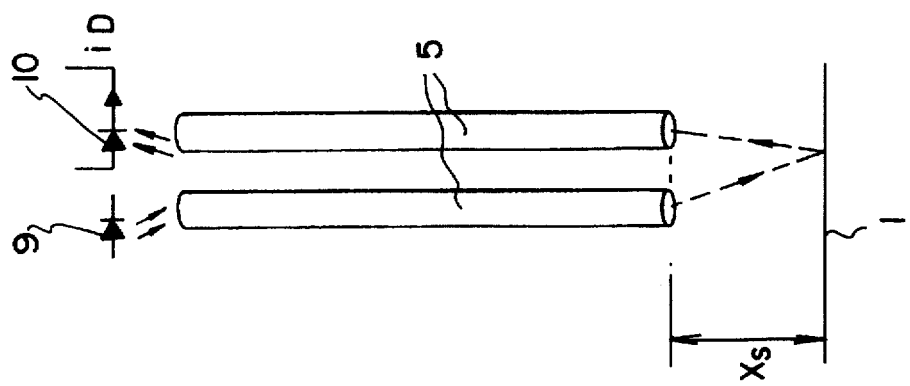
Fig. 2B
Fig. 2A

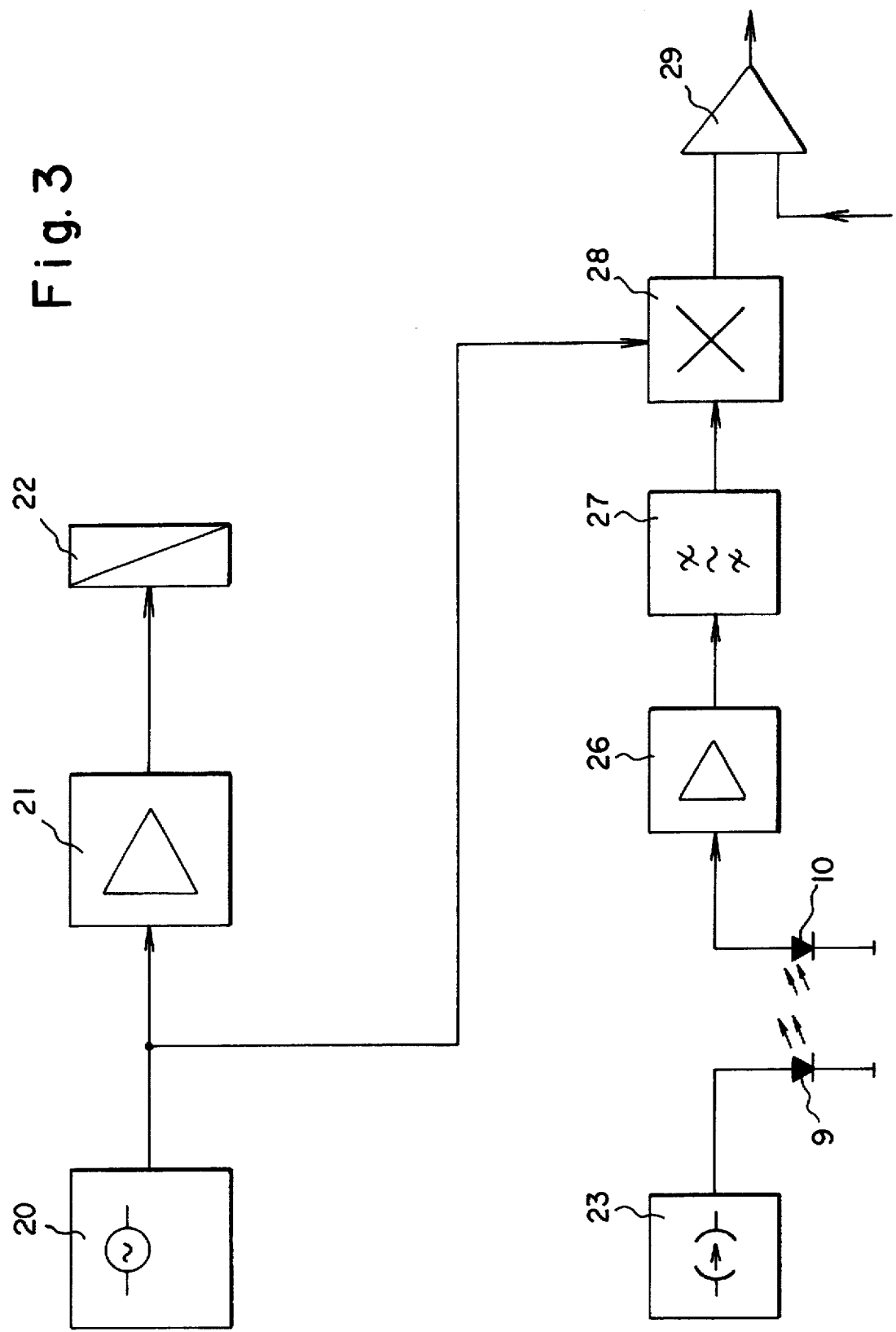

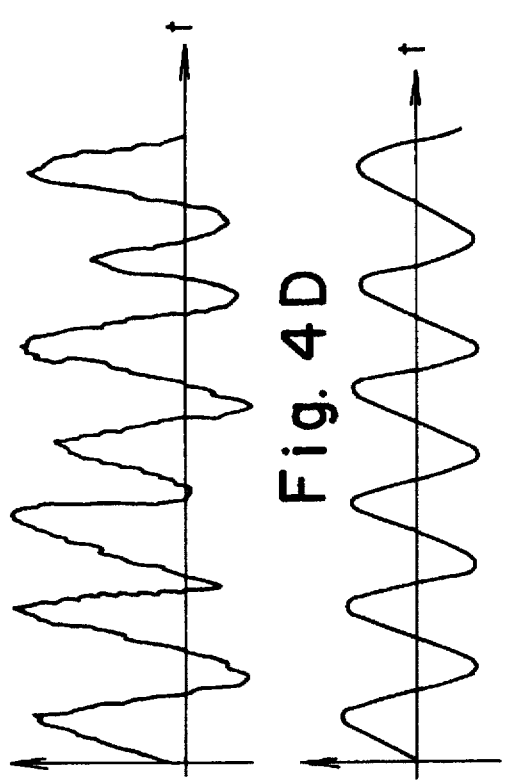
Fig. 4C
Fig. 4D
Fig. 4E
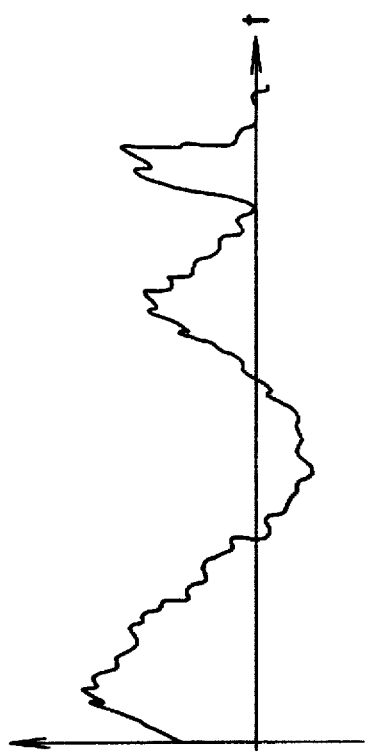
Fig. 4A
Fig. 4B

DEVICE FOR THE DETECTION OF LIQUID SURFACES

The present invention addresses a device for the detection of liquid surfaces which comprises
- a light source for sending light onto the liquid surface, said light source being disposed above the liquid surface,
- an oscillation element which can be moved toward the liquid surface with the aid of a drive unit,
- an excitation element to cause the oscillation element to oscillate,
- a detector to detect the light reflected by the liquid surface,
- a frequency filter to separate the wanted signal present at the detector from interfering signals,
- and an evaluation unit which detects a contact between oscillation element and liquid surface based on the filtered detector signals.

Methods and devices for detecting liquids are particularly important in the field of clinical chemistry where automated analyzers are used which require the detection of liquid surfaces.

Prior art knows several methods for the detection of liquid surfaces. The most widely spread principle is based on a capacity change when an electrode makes contact with the surface of a liquid. A device of this type is described in European patent EP-B-0 355 791. Another principle for the detection of liquids proposes to measure pressure changes within the pipetting system, when the pipette tip is immersed into a liquid. This provokes a pressure increase which in turn indicates the surface of the liquid.

The methods for detecting liquid surfaces known in prior art are accompanied by several sources of interference. When a capacitive liquid level detection method is employed, motors inside the analyzer may generate electric fields to which the level detectors are then exposed, for example. Fluctuations in the current or switching processes in the instrument may also entail detection errors. A drawback of the methods that are based on pressure changes is that pressure changes inside the room, e.g. closing doors, may lead to erroneous detection results.

It was, hence, an object of the present invention to provide a system for the detection of liquid surfaces which can be used for the reliable detection of liquid surfaces while operating largely independent of interfering electromagnetic radiation and pressure changes.

Accordingly, the invention proposes the above mentioned device and a method for the detection of liquid surfaces using said device.

The basis of the detection principle of the invention is to send a light beam onto the liquid surface. The beam that is reflected by the surface is then evaluated. During this procedure, an oscillation element which was made to oscillate is lowered onto the surface of the liquid. As soon as the oscillation element contacts the surface of the liquid, the latter is also made to oscillate. This modulates the light emitted by the light source so as to change the signal available at the detector. Said signal serves as a wanted signal for the detection of the liquid surface.

In accordance with the invention, the detection of liquid surfaces is usually carried out in vessels that are open toward the top, e.g. cuvettes, reagent tubes, or incubation vessels. The detection method in question is principally suitable for all known liquids since its proper functioning merely requires a reflecting surface.

The great variety of possible light sources includes incandescent lamps, light emitting diodes, and gas-filled tubes. The term light is understood to also cover radiation that is not in the visible range. It may, for example, be advantageous to emit infrared or ultraviolet light as this avoids interference caused by visible light. Infrared light is particularly suitable for the invention as it is easy to generate this type of light with the aid of infrared LEDs.

Possible detectors are principally all those used the field of optics. They include in particular photodiodes, phototransistors, photovoltaic elements, and bolemeters. Light source and detector are selected such that the detector is sensible to at least a part of the radiation emitted by the light source.

As already mentioned at the onset, an oscillation element which is excited by an excitation element is lowered onto the liquid surface. The oscillation generated by the element is transferred to the liquid surface as soon as the oscillation element has established contact with the liquid surface. The movement of the oscillation element onto the liquid surface can be generated automatically with the aid of a drive unit, for example, a gear motor drying a rack.

Advantageously, the oscillation clement has a rod-like shape and is moved forward with the front side facing toward the liquid surface. The oscillation of said element can be oriented such that the rod oscillates either perpendicularly or parallel to the liquid surface. Good results have been obtained with oscillations that run perpendicular to the liquid surface. Is has also proven to be favorable to have a rod with a sufficiently large front side. When selecting the size of the front two competing principles must be taken into consideration. First, the front side should be as small as possible to have only a minimum amount of liquid adhering to it. Secondly, the size of said front side should be large enough to ensure sufficient excitation of the liquid surface. Cross sections between 0.01 $mm^2$ and 1 $mm^2$ have proven to be well suited.

The oscillations of the oscillation element are generated with the aid of an excitation element. The latter can be a piezoelectric crystal, for example, to which the oscillation element is attached. Such piezoelectric crystals can, for example, be obtained from the following companies: Siemens AG, Stettner GmbH, or Valvo. It is also possible to excite the oscillation element with the aid of an electromagnet.

Another important aspect of the invention is that the radiation emitted by the light source arrives at the detector after being reflected by the liquid surface. This necessity entails a triangular arrangement of light source, liquid surface, and detector. In a particularly advantageous embodiment, the radiation of the light source is fed to the liquid surface via a fiber-optical light guide. The radiation reflected by the liquid surface is also picked up by a light guide and directed to the detector. An arrangement of this type is described in "Measurement Systems, application and design", Doeblin, Ernest O., McGraw-Hill Book Company, 3rd edition, 1983 pages 273 et seq.

For the invention, it has proven to be particularly advantageous if the ends of the light guides are disposed essentially parallel or in an acute angle to one another while being in the vicinity of the liquid surface.

Suitable light guides are available from Asea Brown Boveri or ITT, for example.

In order to eliminate changes to the liquid surface caused by the vibrations of a vessel or other external influences, the detector signals are filtered prior to evaluation. As such interfering signals are usually found within a frequency range of only a few hertz, a high pass filter is suitable for their separation. A particularly suitable band filter is one that allows those signals to pass which oscillate with the frequency of the oscillation element. This is usually the frequency of the liquid surface. It has proven to be advantageous to have a band filter that allows oscillations with a frequency of ±5% of the main frequency to pass. The filtered signals can be advantageously evaluated by rectifying the signals and comparing the rectified voltage with a threshhold value.

A suitable frequency for the excitation of the liquid surface by the oscillation element is one between 30 and 100 kHz. Frequencies between 100 Hz and 1 kHz are particularly suitable.

The frequency of the liquid surface itself depends upon a number of factors including viscosity, surface tension, and extension of the liquid surface. It is favorable to select the oscillation frequency of the oscillating element such that it is close to an eigen frequency (main frequency) of the liquid surface. This case allows an efficient energy transfer from the oscillation element to the liquid surface.

The light sent from the light surface onto the liquid surface is modulated by the oscillation of the liquid surface. It has also proven to be advantageous if the light emitted by the light source is modulated by a second frequency. With the use of the already mentioned band filter and another second such filter, it is possible to further improve the suppression of foreign light.

The optical detection can also be improved by selecting a suitable distance between light source/detector and liquid surface and/or between light guide ends and liquid surface. The device may therefore propose to vary the distance between light source and detector and/or light guide ends with the aid of corresponding device to ensure an optimal path for the light to travel. A favorable path that was determined in an experiment ranged between 5 and 30 mm. A particularly simple measuring arrangement proposes to mechanically couple the movement of the light guide ends to the movement of the oscillation element. This design is particularly advantageous since the signal present at the detector increases when the light guide ends move closer to the liquid surface. The course of the signal when moving the light guide ends closer to the liquid surface, hence, supports the detection process.

The method of the invention for detecting liquid surfaces can be advantageously used to detect the liquid surface once, store the result, and used it then for the pipetting of liquid.

In an advantageous embodiment of the invention, a pipetting needle is used as an oscillation element. It is the object of this detection procedure to move the pipetting needle as close to the liquid as possible to allow pipetting of liquid while immersing the tip as little as possible to minimize contamination of the liquid.

It is, hence, favourable to link the liquid level detection unit with the drive unit in order to reduce the immersion depth of the oscillation element or the pipetting needle.

The invention also relates to a method for the detection of liquid surfaces where a liquid surface is exposed to light; a part of the light reflected by the liquid surface is picked up by a detector and via a band filter fed to an evaluation unit; the oscillation element is made to oscillate and then moved toward the liquid surface; based on the detector signals filtered and passed by the band filter, the evaluation unit detects a contact between oscillation element and liquid surface.

In an improvement of the method, the approach of the oscillation element toward the liquid surface is stopped upon detection of the liquid surface in order to avoid continued immersion of the oscillation element into the liquid. If, for example, a pipetting needle is used instead of the oscillating element, it is expedient that the needle immerses only another few millimeters, for example, in order to allow pipetting.

The functioning of the present invention is explained in greater detail with respect to the figures.

FIG. 1: Device for detecting liquid surfaces
FIG. 2: Characteristic line of a fiber-optical arrangement
FIG. 3: Schematic circuit diagram showing the electronic control and evaluation units
FIG. 4: Signal curves FIG. 1 shows an arrangement for the detection of liquid surfaces 1. To make the liquid surface oscillate, the arrangement is equipped with an oscillation element 2 to which a piezoelectric crystal is attached. The piezoelectric crystal 3 itself is attached to a plate 8 which can be moved relative to the liquid surface 1 via a plunger 4. The plate also has two light guiding rods 5. The top 6 of the one light-guiding rod is connected to an infrared LED (not displayed). The light travelling through this light-guiding rod impinges on the liquid surface 1 from which it is reflected. The light reflected by the surface is picked up by a second light-guiding rod to the top 7 of which there is attached a (not displayed) infrared detector.

FIG. 2 shows the dependency of the radiation intensity picked up by the detector 10 upon the distance of the light-guiding rods 5 from the surface 1. The detected radiation intensity increases with an increasing distance between the light-guiding rods 5 and surface 1' to reach a maximum value ($X_{so}$) and decreases with a decreasing distance $X_r$. It has proven to be advantageous to select the distance $X_{AP}$ used in the invention such that it is larger than $X_{so}$. This ensures that the light guide ends are not contaminated with liquid.

FIG. 3 is a basic circuit diagram for the liquid level detection. The oscillator 20 generates a sinus oscillation with a frequency of 40 kHz which is amplified via a driver 21 and fed to the piezoelectric crystal 22. The piezoelectric crystal 22 of FIG. 3 is identical to the piezoelectric crystal 3 of FIG. 1.

The lower part of FIG. 3 shows a controllable source 23 of a constant voltage source to activate the infrared LED 9. The liquid surface reflects the emitted radiation which then arrives at the infrared detector 10. The signal generated there is amplified via a driver 26 and fed to band filter 27. In the present case, the band filter is set such that it allows frequencies around 40 kHz to pass. The signal which is filtered by band filter 27 is fed to a lock-in amplifier 28 to which the oscillator signal 20 is also fed. Said lock-in amplifier compares the signals and feeds the detector signal which is identical with the oscillator signal to a comparator 29 where it is compared to a threshold signal. If the signal is above the threshold signal, a positive voltage which can be used for the detection of the liquid surface is present at the comparator output. The lock-in amplifier is also referred to as a "synchronous rectifier". The functioning of this element is described in "Halbleiterschaltungstechnik" U. Tietze, Ch. Schenk. 7th edition, Published by Springer Verlag, pages 797 et seq.

FIG. 4 shows different signal curves as they can be obtained with a device according to FIG. 1.

FIG. 4A shows the direct and unfiltered light signal measured at the light guide 7. The signal shown in FIG. 4A is one obtained when the oscillating element has not yet made contact with the liquid surface while a static oscillation of the liquid surface is already present. In all diagrams of FIG. 4, the intensity of the electric signal is plotted on the ordinate while the time is plotted on the abscissa.

FIG. 4B shows a signal as it can be obtained with a circuit according to FIG. 3 if the infrared detector 10 feeds a signal according to FIG. 4A to driver 26. In the present case, the comparator 29 does not supply a signal since the static intensity fluctuations of FIG. 4A are filtered out by band filter 27.

FIG. 4C shows an electric signal that is present at the radiation detector 10 if the oscillation element contacts the liquid surface. It can be seen that the signal exhibits periodical oscillations superimposed by an interfering light.

FIG. 4D shows a signal curve that can be obtained when the signal of FIG. 4C is filtered by band filter 27.

Figure 1:
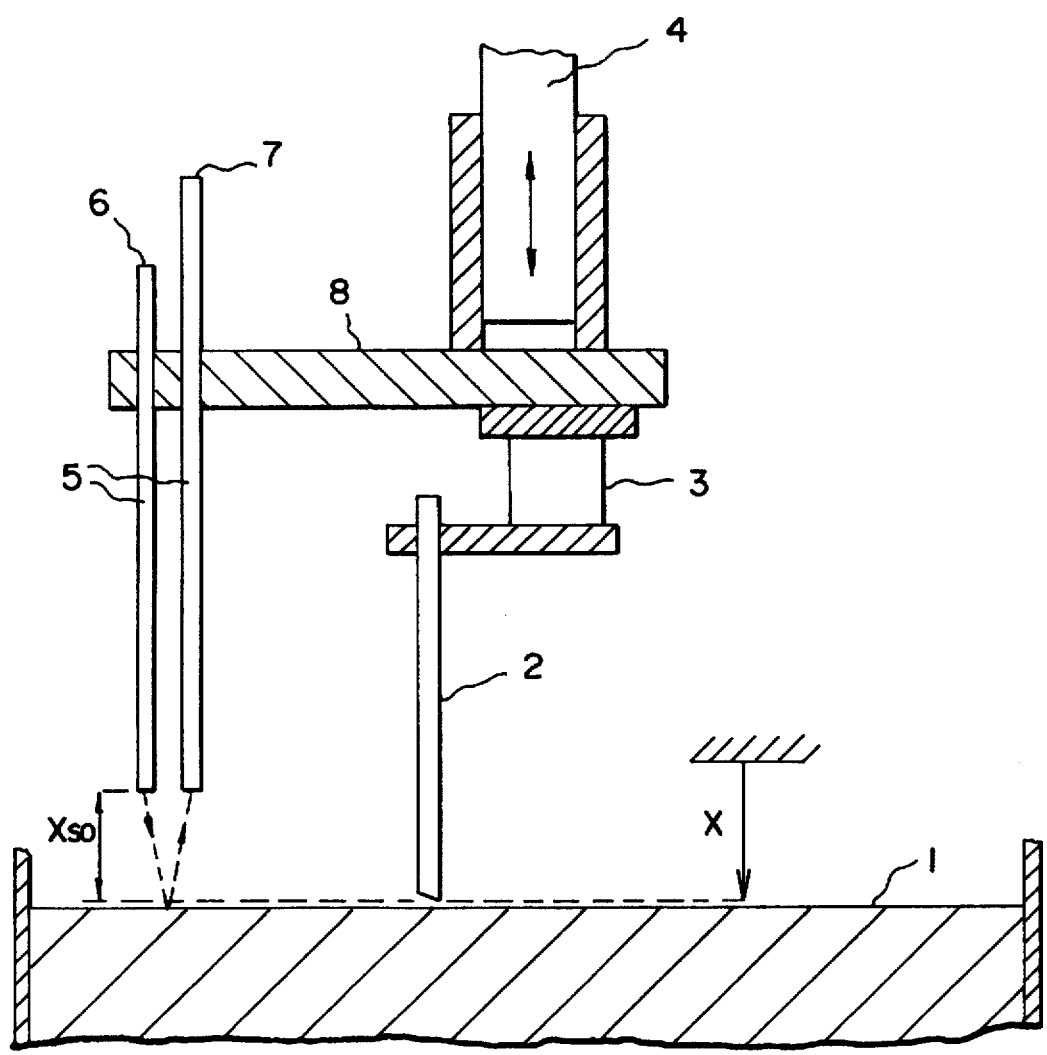

The signal shown in FIG. 4E is obtained by rectifying the signal of FIG. 4D. This shows that a lock-in amplifier and a comparator are not absolutely necessary to evaluate the filtered signal. The filtered signal can already be evaluated by means of a simple rectifier circuit.

List of reference numerals
1. liquid surface
2. oscillation element
3. piezoelectric crystal
4. movable plunger
5. light guides
6. light guide which serves as a radiation source
7. light guide which serves as a radiation receiver
8. holding plate
9. light source
10. detector
20. oscillator
21. dryer
22. piezoelectric crystal
23. controllable source of constant voltage
26. driver
27. band filter
28. lock-in amplifier
29. comparator

I claim:

1. A device for detecting a liquid surface, said device comprising:
    a light source disposed above a liquid surface to be detected;
    detector means above said liquid surface, said detector means for detecting light from said light source which is reflected by the liquid surface, said detector means generating a detection signal based upon the light detected thereby;
    oscillation means disposed above the liquid surface, said oscillation means for contacting the liquid surface;
    excitation means coupled to said oscillation means, said excitation means for exciting said oscillation means and transmitting an oscillation thereto;
    drive means coupled to said oscillation means for moving said oscillation means to and from the liquid surface;
    filter means coupled to said detector means, said filter means receiving the detection signal and outputting a filtered signal by filtering interfering signals therefrom; and
    evaluation means coupled to said filter means, said evaluation means detecting a contact between the oscillation means and the liquid surface, the contact being detected based upon the filtered signal.

2. A device as recited in claim 1, wherein said filter means comprises a frequency band filter.

3. A device as recited in claim 1, further comprising a first light guide for guiding light from said light source onto the liquid surface.

4. A device as recited in claim 3, further comprising a second light guide for guiding light reflected from the liquid surface to said detector means.

5. A device as recited in claim 4, wherein said first and second light guides include first and second axes, respectively, said first and second axes being disposed substantially in parallel.

6. A device as recited in claim 4, wherein said first and second light guides include first and second axes, respectively, said first and second axes being disposed at an acute angle with respect to each other.

7. A device as recited in claim 4, wherein said drive means moves said first and second light guides to and from the liquid surface, in addition to the oscillation means.

8. A device as recited in claim 4, further comprising moving means to move ends of said first and second light guides perpendicularly to the liquid surface.

9. A device as recited in claim 8, wherein said moving means comprises connecting means for connecting said first and second light guides to said drive means.

10. A. device as recited in claim 1, further comprising moving means to move said light source and said detector perpendicularly to the liquid surface.

11. A device as recited in claim 8, wherein said moving means comprises a connecting member connecting said light source and said detector to said drive means.

12. A device as recited in claim 1, wherein said drive means is configured to move said light source and said detector means to and from the liquid surface.

13. A device as recited in claim 1, wherein said oscillation means oscillates at a frequency between 100 Hz and 1 kHz.

14. A device as recited in claim 1, wherein said filter means is configured to filter frequencies which do not correspond to an oscillation frequency of said oscillation means, thereby passing a frequency which corresponds to the frequency of the oscillation means.

15. A device as recited in claim 1, wherein said evaluation means controls the drive means to move the oscillation means to and from the liquid surface based upon the detection signal.

16. A device as recited in claim 1, wherein said light source provides modulated light.

17. A device as recited in claim 1, wherein said oscillation means comprises a pipette tip.

18. A method for the detection of a surface of a liquid, said method comprising the steps of:
    oscillating an oscillating member above a liquid surface;
    moving said oscillating member toward the liquid surface;
    exposing a liquid surface to be detected to light from a light source;
    detecting light from said light source which has been reflected from said liquid surface with a detector means, wherein said detector means generates a detection signal;
    filtering the detection signal, thereby producing a filtered signal;
    determining contact between the oscillating member and the liquid surface based upon the filtered signal.

19. A method as recited in claim 18, further comprising the step of stopping the movement of the oscillating member after the contact between the oscillating member and the liquid surface has been detected.

20. A method as recited in claim 18, further comprising a step of stopping the movement of the oscillating member after the oscillating member has moved downward by a predetermined distance after the contact between the oscillating member and the liquid surface has been detected.

21. A method as recited in claim 18, further comprising a step of pipetting liquid after the contact has been detected.

22. A method as recited in claim 18, further comprising a step of rectifying the filtered signal to generate a rectified voltage, and comparing the rectified voltage with a reference voltage, wherein contact between the oscillating member and the liquid surface is detected when the rectified voltage exceeds the reference voltage.

23. A method for detecting a liquid surface, said method comprising the steps of:

providing a light source and a detector above a liquid surface, said detector for detecting light from the light source which is reflected by the liquid surface, with the detector generating a detection signal based upon the light detected thereby;

providing an oscillating member above the liquid surface, said oscillating member being movable to and from the liquid surface;

providing an excitation means for exciting said oscillating member, by translating an oscillation thereto; said method further comprising the steps of oscillating said oscillating member through excitation of the excitation means;

moving the oscillating member toward the liquid surface;

radiating light from the light source toward the liquid surface;

detecting light reflected from the liquid surface with the detector such that the detector generates the detection signal;

filtering the detection signal with a filtering means, and outputting a filtered signal therefrom;

determining a contact between the oscillating element and the liquid surface based upon the filtered signal.

* * * * *